United States Patent
Moote et al.

(10) Patent No.: US 7,161,617 B2
(45) Date of Patent: Jan. 9, 2007

(54) DATA MONITORING SYSTEM

(75) Inventors: Stanley R. Moote, North York (CA); Steven T. Sulte, Markham (CA); Artur B. Twarecki, Toronto (CA); Anthony S. Singh, Ottawa (CA)

(73) Assignee: Leitch Technology International Inc., Toronto (CA)

( * ) Notice: Subject to any disclaimer, the term of this patent is extended or adjusted under 35 U.S.C. 154(b) by 249 days.

(21) Appl. No.: 10/125,376

(22) Filed: Apr. 19, 2002

(65) Prior Publication Data
US 2002/0163963 A1  Nov. 7, 2002

(30) Foreign Application Priority Data
Apr. 23, 2001  (CA) .................... 2344930

(51) Int. Cl.
*H04N 17/00* (2006.01)
(52) U.S. Cl. ........................... 348/180
(58) Field of Classification Search ........ 348/153–155, 348/159, 143
See application file for complete search history.

(56) References Cited

U.S. PATENT DOCUMENTS

| | | | | |
|---|---|---|---|---|
| 5,221,967 A | * | 6/1993 | Ward et al. ................. | 348/180 |
| 5,504,522 A | * | 4/1996 | Setogawa .................... | 348/185 |
| 5,808,671 A | * | 9/1998 | Maycock et al. ............. | 348/180 |
| 5,982,418 A | * | 11/1999 | Ely ............................ | 348/153 |
| 6,175,386 B1 | * | 1/2001 | Van De Schaar-Mitrea et al. .......................... | 348/563 |
| 6,377,299 B1 | * | 4/2002 | Hamada ...................... | 348/192 |
| 6,411,209 B1 | * | 6/2002 | Lyons et al. ................. | 340/541 |
| 6,476,858 B1 | * | 11/2002 | Ramirez Diaz et al. .... | 348/159 |
| 6,493,024 B1 | * | 12/2002 | Hartley et al. .............. | 348/180 |
| 6,618,074 B1 | * | 9/2003 | Seeley et al. ................ | 348/143 |
| 6,690,414 B1 | * | 2/2004 | Lyons et al. ................. | 348/156 |
| 6,700,605 B1 | * | 3/2004 | Toyoda et al. .......... | 348/211.13 |
| 6,795,642 B1 | * | 9/2004 | Matsumoto et al. ........ | 386/109 |
| 2002/0009051 A1 | * | 1/2002 | Cloonan ...................... | 370/232 |

FOREIGN PATENT DOCUMENTS

| | | |
|---|---|---|
| EP | 1 087 620 A2 | 3/2001 |
| WO | WO98/41021 A1 | 9/1998 |
| WO | WO 98/41021 A1 | 9/1998 |
| WO | WO 99/12349 A1 | 3/1999 |
| WO | WO99/12349 A1 | 3/1999 |

* cited by examiner

*Primary Examiner*—Paulos M. Natnael
(74) *Attorney, Agent, or Firm*—Dimock Stratton LLP; Mark Eisen

(57) ABSTRACT

A system for adding monitoring capability to equipment located within a video, audio and/or data production facility. A sampling device is connected to a data communications network and transmits a continuous representation of the video, audio or data being sampled over a data communications network in response to commands from an operator station. To accommodate monitoring of large numbers of sampling devices on a single network, the sampling device may encode and/or compress the video, audio or data being monitored prior to transmitting the sample over the network. The sampling device may also further reduce its contribution to network loading by providing an instant sample of the stream being sampled, such as a single video frame, either a single time, or repeatedly at regular predetermined time intervals.

20 Claims, 3 Drawing Sheets

DATA MONITORING SYSTEM

FIELD OF INVENTION

This invention relates to systems for the generation, production, processing, and transmission of audio, video, and data.

BACKGROUND OF THE INVENTION

Modern facilities for the generation, production, processing, and transmission of audio, video, and data are often composed of many interconnected pieces of equipment from different manufacturers. Control and monitoring of the many different pieces of equipment is a frequent problem. Although remote control protocols have been adopted to allow control of equipment from a remote location, different manufacturers often adopt vastly different protocols. Additionally, monitoring the output of the equipment is similarly difficult.

For example, in order to monitor the outputs of ten different units of video processing equipment, ten different cables must be employed to carry the separate video signals to the monitoring location. Then, ten monitors are required to view the video signals simultaneously. A video switcher can also be connected to the cables to select a single signal for viewing on one suitable display device. Or, for viewing several feeds simultaneously on a single monitor, a video multiplexer can be used, such as that described in U.S. Pat. No. 4,266,242, entitled "Television Special Effects Arrangement". Although the use of a video switcher or a video multiplexer reduces the number of video monitors required, a separate cable is still required to carry the signal from the desired monitoring point to the selector or multiplexer. Since a typical facility can contain hundreds or thousands of different pieces of equipment, either massive cabling schemes must be implemented or monitoring capability must be limited to a few selected pieces of equipment.

Networking techniques have evolved to permit remote control of equipment. Manufacturer-specific control schemes have largely given way to standard-based control schemes using the Internet Protocol, such as SNMP (Simple Network Management Protocol). Equipment implementing a standard-based networking control protocol can be connected together on a single data communications network such as Ethernet and managed by a single operator station. Commands sent from the operator station are transmitted through the data communications network bearing an address specific to the unit of equipment being controlled. The unit of equipment may also transmit status and alarm information to other pieces of equipment or the operator station. Alternatively, a facility controlled in such a fashion may be operated remotely by an operator using a computer connected through the Internet.

However, the standards-based methods do not provide a method for monitoring the streams of video, audio and/or data being generated, switched, or processed by the equipment in the facility.

SUMMARY OF THE INVENTION

The present invention adds monitoring capability to equipment located within a video, audio and/or data production facility by placing a sampling device in the equipment to be so monitored. The sampling device is connected to a data communications network and transmits a continuous representation of the video, audio or data being sampled over a data communications network in response to commands from an operator station. To accommodate monitoring of large numbers of sampling devices on a single network, the sampling device may encode and/or compress the video, audio or data being monitored prior to transmitting the sample over the network. The sampling device may also further reduce its contribution to network loading by providing an instant sample of the stream being sampled, such as a single video frame, either a single time, or repeatedly at regular predetermined time intervals.

The present invention thus provides a data monitoring system comprising a signal processing block, at least one output connected to said processing block, a compressor connected to said output of said processing block, and a data network connected to said compressor and to at least one monitoring station, whereby said monitoring station receives an output of said compressor in order to monitor the output of said signal processing block.

The present invention further provides a television monitoring system comprising a television signal processing block, at least one output connected to said processing block, a video compressor connected to said output of said processing block, and a data network connected to said video compressor and to at least one monitoring station, whereby said monitoring station receives an output of said video compressor in order to monitor the output of said signal processing block.

The present invention further provides a television monitoring system comprising a television signal processing block, at least one video output connected to said processing block, a video compressor connected to said video output, at least one audio output connected to said processing block, an audio compressor connected to said audio output, and a data network connected to said video compressor and said audio compressor, and to at least one monitoring station whereby the data network receives outputs of said video compressor and said audio compressor in order to monitor outputs of said signal processing block.

In a further aspect of the system of the invention, signals received by said data network are controlled by commands transmitted from said data network.

BRIEF DESCRIPTION OF THE DRAWINGS

In drawings which illustrate by way of example only a preferred embodiment of the invention.

DETAILED DESCRIPTION OF THE INVENTION

Figure 1:
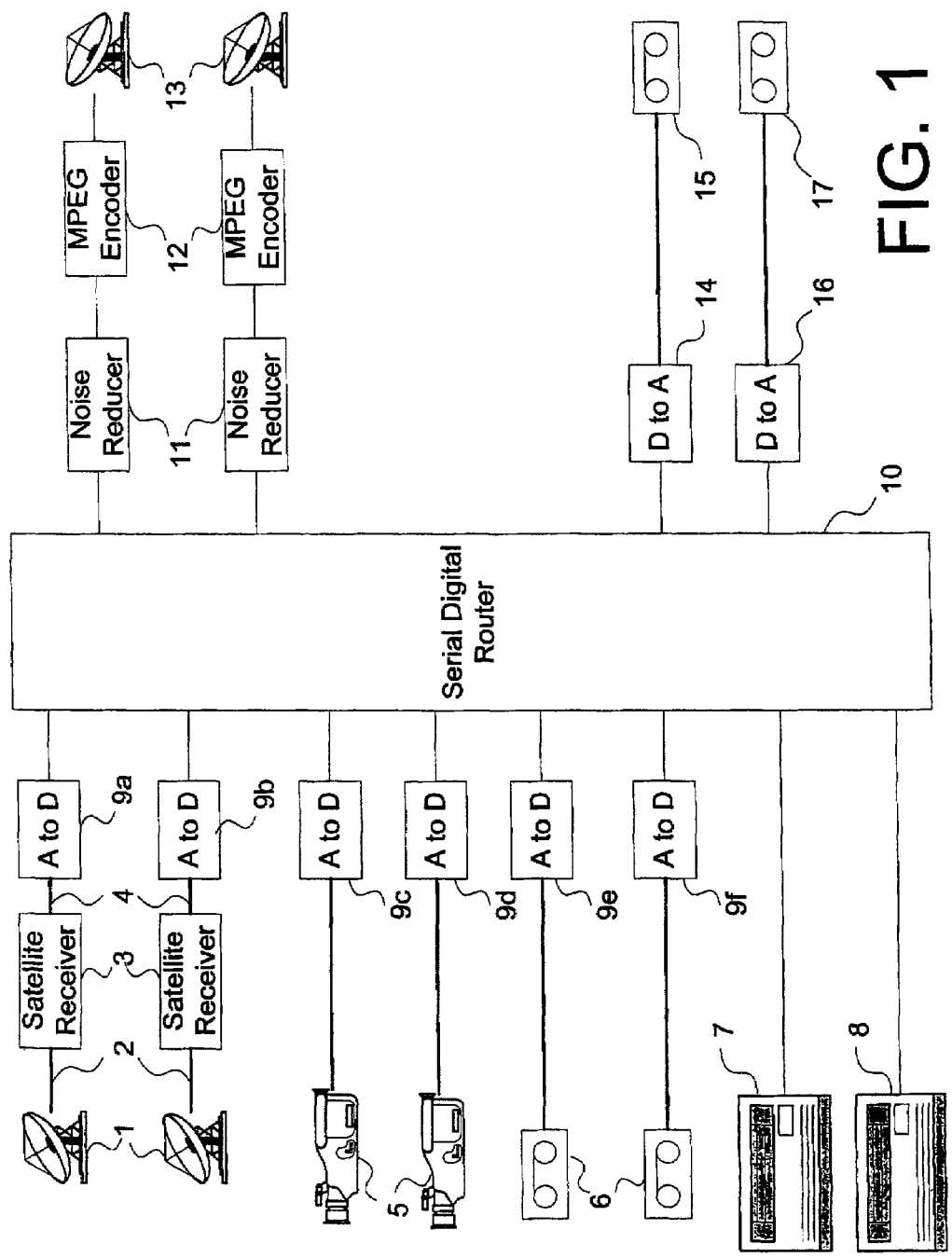
FIG. 1 is a block diagram showing the typical equipment connection diagram of a small television production facility.

FIG. 1 shows a block diagram of a hypothetical typical television production facility. Modern television facilities may have hundreds of video, audio and data inputs and outputs; however, for ease and clarity of illustration, the television production facility depicted in FIG. 1 is shown with a small number of inputs and outputs by way of example.

Satellite antennae 1 are connected through radio frequency cables 2 to satellite receivers 3, each of which processes and selects a channel for output to the facility. This channel may consist of one or more channels of video and associated audio and data. Satellite receivers 3 output video, audio and associated data which are converted in analog to digital converters 9a and 9b to the preferred SDI (Serial Digital Interface) format. In the SDI format, the video is converted to a digital signal at the rate of 270 megabits per second (Mbps) with digital audio in the AES/EBU format and associated data signals interleaved within the digital signal. The SDI signal format is well known in the art and is standardized in the SMPTE-295M standard of the SMPTE (Society of Motion Picture and Television Engineering).

In similar fashion, television cameras 5 output video signals, and their video signals are converted into SDI signals in analog to digital converters 9c and 9d. For ease and clarity of illustration, the audio channels associated with television cameras 5 are not shown, but are handled in the same manner.

Video tape player/recorders (VTRs) 6 also provide video, audio and data sources, and the video, audio, and associated data are converted in analog to digital converters 9e and 9f. Digital video servers 7 and 8 also provide video and audio inputs to the facility, but since each provides outputs already in the SDI format, no analog to digital conversion step is required.

The outputs of analog to digital converters 9a through 9f, and digital video servers 7 and 8, all in the SDI format, are routed to serial digital router 10, which can select any input and reproduce it on one or more outputs. In FIG. 1, inputs to serial digital router 10 are shown on the left side, while the outputs are shown to the right side. In the hypothetical television facility of FIG. 1, two outputs of serial digital router 10 are connected to noise reducers 11, which reduce noise components of the input video signal which can adversely affect subsequent video compression. The outputs of noise reducers 11, still in SDI format, are connected to MPEG encoders 12. The signals are converted into RF and transmitted to communications satellites at transmit antennas 13 using techniques well known to one skilled in the art. The serial digital router 10 can be operated to present the same signal to the noise reducers 11 or two different signals.

In similar fashion, two other outputs of the serial digital router 10 are connected to digital to analog converters 14 and 16, which convert the SDI signal back into an analog format. The analog audio and video signals are then connected to VTRs 15 and 17.

It is often useful to place monitoring connections at the inputs and/or outputs of the various units of equipment shown in FIG. 1. This monitoring serves two purposes; first to monitor the quality of the outputs of the equipment at various processing stages in the facility, and second to pinpoint the location of equipment failures in the facility.

Figure 2:
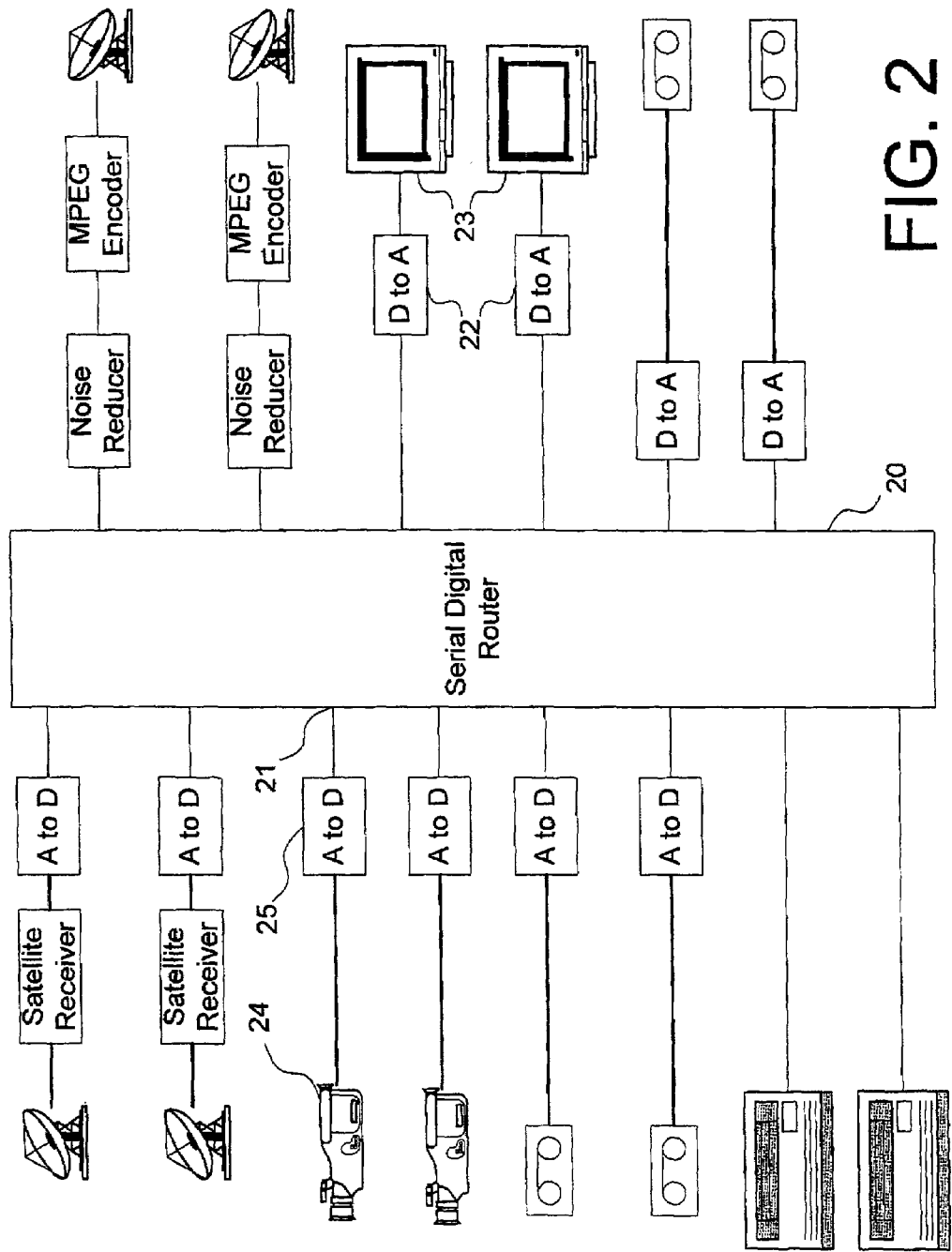
FIG. 2 is a block diagram showing the small television production facility of FIG. 1 with the addition of monitoring capability through the use of technology from the prior art.

FIG. 2 shows the television production facility in FIG. 1 with the addition of monitoring connections to serial digital router 20. Digital to analog converters 22 convert the SDI output signal from serial digital router 20 to an analog format suitable for display on standard television monitors 23. In this fashion two different inputs from the serial digital router 20 can be displayed on monitors 23.

However, this monitoring capability has the disadvantages of tying up outputs from the main serial digital router 20, as well as the fact that only inputs to the serial digital router 20 can be monitored. If, for example, the input 21 to the serial digital router 20 corresponding to camera 23 fails, the prior art monitoring solution in FIG. 2 cannot determine if the problem is in the camera 23, connecting cable 24, or in the analog to digital converter 25.

It is possible to connect additional monitoring cables to camera 23, connecting cable 24, and the analog to digital converter 25 however, this increases the number of monitoring points required to four times just in the simple facility. Buffer amplifiers are required at the monitoring points to avoid changing the amplitude of the signal at the facility point being monitored. In addition, unless a suitable video display device is provided for each individual signal to be monitored, some separate means of selecting the video signal to be monitored must be provided. The magnitude of the complexity of this monitoring arrangement is apparent even with the small example facility illustrated.

Figure 3:
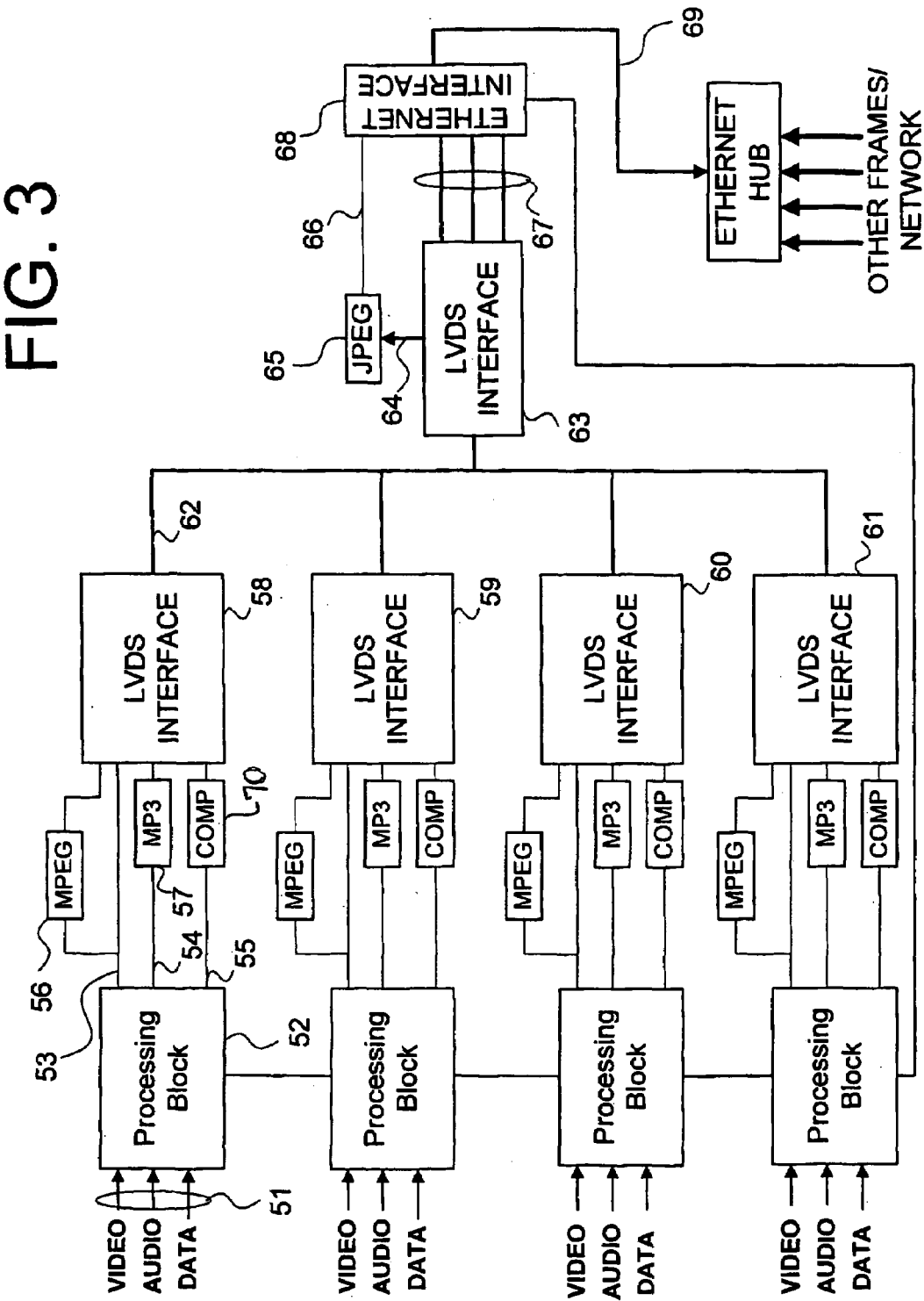
FIG. 3 is an internal block diagram of a television equipment frame containing a preferred embodiment of the invention.

FIG. 3 is a detailed block diagram of a preferred embodiment of the invention. In a preferred embodiment, four video/audio/data processing blocks 52 are located in a single rack mounted enclosure, permitting common power supplies and other support functions to be shared among the processing blocks 52. Each processing block 52 has audio, video and data inputs 51. The audio may be in analog format or may be in a digital form such as a version of AES/EBU (Audio Engineering Society/European Broadcast Union) which is well known in the art. Similarly, the video input to the processing block may be in analog format or in SDI digital format. Another input in the group of inputs 51 is an ancillary digital data input which can consist of closed captioning data or other data unrelated to the video and audio signals in input group 51 but associated with them for the purposes of transmission and/or processing. Processing block 52 can perform any of a wide variety of functions, including those performed by analog to digital converter 9a shown in FIG. 1.

In a preferred embodiment, processing block 52 has an SDI video output 53, an audio output 54, and ancillary digital data output 55. Video output 53 is connected to an MPEG (Motion Picture Experts Group) compression block 56, which compresses the SDI interface into a lower bit rate MPEG-1 or MPEG2 compressed format. MPEG-1 and MPEG-2 are video compression standards well known in the art, and described in ISO standard series 13818 documents. Audio output 54 is compressed using a compatible audio compression format, such as the well-known MPEG-2 Level 3 (mp3) format, also fully described in the ISO standard series 13818 documents. Ancillary digital data output 55 is also compressed in data compressor 70 using a suitable data compression format, such as run length encoding or the LZW compression format.

In a preferred embodiment, the full-bandwidth 270 Mbps SDI video output 53, its MPEG-compressed representation, the audio stream compressed by audio compressor 57, and the ancillary data stream compressed by data compressor 70, are connected to LVDS (Low Voltage Differential Signaling) interface 58 which multiplexes these signals onto enclosure monitoring bus 62 along with the outputs of LVDS interfaces 59, 60 and 61. LVDS is a low-voltage differential signaling standard which allows very high data rates while minimizing crosstalk and electromagnetic emissions.

In a preferred embodiment, the data contained on enclosure monitoring bus 62 is transported in an SDI format, however enclosure monitoring bus 62 operates at 810 Mbps, three times the standard 270 Mbps format, which allows three or more SDI signals to be carried simultaneously. In addition, a preferred embodiment accepts commands from Ethernet network 69 which are received by Ethernet interface 68 and transmitted back through LVDS interface 63 to LVDS interfaces 58, 59, 60 and 61 to adjust the order and type of the incoming data placed on enclosure monitoring bus 62.

For example, the LVDS interfaces 58, 59, 60, and 61 can be initially configured to transmit data to the enclosure monitoring bus 62 operating at three times SDI speed in a round-robin format; that is, first LVDS interface 58 can send an SDI video frame, followed by an SDI frame from LVDS interface 59, then an SDI frame from LVDS interface 60, then an SDI frame from LVDS interface 61. Since in FIG. 3 there are four LVDS interfaces, the frame rate from each LVDS interface is necessarily limited to a maximum of ¾ the standard 30 frames per second. If a higher-speed enclosure monitoring bus is selected, for example 1.28 Mbps or four times the 270 Mbps SDI rate, 30 frames per second can be transmitted over the enclosure monitoring bus from each of the four LVDS interfaces 58, 59, 60 and 61.

In a preferred embodiment, the LVDS interfaces can be commanded to place digital data from the MPEG compressor 56 and audio compressor 57 into an SDI video frame along with ancillary digital data compressed by data compressor 70. In this manner, full 30 frame per second monitoring of a video stream along with its audio track and affiliated data can be performed. In addition, the SDI frame structure contains extra space not normally used for carrying video in the SDI format which can be utilized for additional data capacity. Ethernet interface 68 receives commands from operator stations on Ethernet network 69 which are then transmitted to the LVDS interfaces 58, 59, 60 and 61 to change the composition of the data contained on enclosure monitoring bus 62 as needed for monitoring a specific processing block. As up to twelve or more video processing blocks and associated LVDS interfaces may be connected to a single enclosure monitoring bus, this feature is especially useful to permit a specific LVDS interface to transmit more of its monitoring information.

In a preferred embodiment, processing block 52 will also send status and alarm information to LVDS interface 58. For example, if processing block 52 loses video or audio input, or detects an internal failure, it generates an alarm signal. This information can be included in the ancillary digital data output 55 and sent to LVDS interface 58, which forwards this data through the enclosure monitoring bus to LVDS interface 63 and onward to the Ethernet interface 68 and Ethernet network 69 to monitoring stations on the Ethernet network. In a preferred embodiment, if LVDS interface 58 transmits alarm information, Ethernet interface 68 or monitoring stations connected Ethernet network 69 can command LVDS interface 58 to send more video, audio, and/or data monitoring information over the enclosure monitoring bus 62 in order to pinpoint the nature of the failure. Alternatively, LVDS interface 58 can spontaneously send more information in response to an alarm. This would occur after coordination with LVDS interface 63 and Ethernet network 68 in order to avoid jamming of the network in the event of multiple simultaneous alarms.

In a preferred embodiment, LVDS interface 63 receives the multiplexed video, audio and data at three times SDI data rate from LVDS interfaces 58, 59, 60 and 61. The data is demultiplexed, and compressed MPEG video, mp3 audio and data outputs 67 are sent to Ethernet interface 68. In order to prevent saturation of the available bandwidth of the network, the full bandwidth SDI data is compressed in JPEG compressor 65 before being sent via output 66 to Ethernet interface 68. Ethernet interface 68 then determines, in response to commands received over Ethernet network 69, the destination of the different types of data it receives from JPEG compressor output 66 and MPEG video, mp3 audio and data inputs 67.

We claim:

1. A data monitoring system comprising
   a signal processing block,
   at least one output connected to said processing block,
   a compressor connected to said output of said processing block, and
   a data network connected to said compressor and to at least one monitoring station for receiving an output of said compressor, in order to monitor a status of the signal output from said signal processing block and, in response to an alarm condition, to selectively output the entire signal or time-divided components of the signal to the data network.

2. The data monitoring system of claim 1, wherein signals received by said data network are controlled by compounds transmitted from said data network.

3. A television monitoring system comprising
   a television signal processing block,
   at least one output connected to said processing block,
   a video compressor connected to said output of said processing block, and
   a data network connected to said video compressor and to at least one monitoring station for receiving an output of said compressor in order to monitor a status of the signal output from said signal processing block and, in response to an alarm condition, to selectively output the entire signal or time divided components of the signal to the data network.

4. The television monitoring system of claim 3, wherein signals received by said data network are controlled by commands transmitted from said data network.

5. The television monitoring system of claim 3, wherein said signal processing block comprises an analog to digital converter.

6. The television monitoring system of claim 3, wherein said compressor is connected to multiplexing interface, and said data network is connected to said compressor through said multiplexing interface.

7. The television monitoring system of claim 3 further comprising
   a plurality of said signal processing blocks, each of said plurality of said signal processing blocks connected to at least one of a plurality of said compressors,
   each of said compressors connected to multiplexing interface connected to a bus connected to the data network,
   wherein the output from said plurality of signal processing blocks is multiplexed by the multiplexing interfaces and received by said bus and commands from the data network are passed through said bus to said multiplexing interfaces.

8. The television monitoring system of claim 7, wherein said multiplexing interfaces transmit an alarm signal to said data network in response to a change in a condition of a signal input to said signal processing block.

9. The television monitoring system of claim 7, wherein said bus is connected to said data network through a demultiplexing interface.

10. The television monitoring system of claim 9, wherein said demultiplexing interface is connected to said data network through a network interface.

11. The television monitoring system of claim 3, wherein said signal processing block comprises multiple outputs, and further comprising interface connected to the data network for multiplexing the outputs of said signal processing block.

12. The television monitoring system of claim 11, wherein each of a plurality of said signal processing blocks is connected to one of a plurality of said multiplexing interfaces, each of said multiplexing interfaces being connected to a bus connected to said data network.

13. The television monitoring system of claim 3, wherein said signal processing block transmits an alarm signal to said data network in response to a change in a condition of a signal input to the signal processing block.

14. The television monitoring system of claim 3, wherein said signal processing block comprises a plurality of inputs.

15. The television monitoring system of claim 14, wherein said signal processing block comprises at least a video signal input and an audio signal input.

16. The television monitoring system of claim 15, wherein said signal processing block comprises an ancillary data input.

17. The television monitoring system of claim 3, wherein said signal processing block transmits data monitoring information to said data network.

18. The television monitoring system of claim 3, wherein said signal processing block converts a video signal to a serial digital interface output.

19. A television monitoring system comprising a television signal processing block, at least one video output connected to said processing block, a video compressor connected to said video output, at least one audio output connected to said processing block, an audio compressor connected to said audio output, and a data network connected to said video compressor and said audio compressor, and to at least one monitoring station whereby the data network receives outputs of said video compressor and said audio compressor in order to monitor the status of the signal outputs of said signal processing block.

20. The television monitoring system of claim 19, wherein signals received by said data network are controlled by commands transmitted from said data network.

* * * * *